United States Patent [19]

Raleigh

[11] Patent Number: 4,630,374
[45] Date of Patent: * Dec. 23, 1986

[54] BRIDGE TYPE COORDINATE MEASURING MACHINE

[75] Inventor: Freddie L. Raleigh, Centerville, Ohio

[73] Assignee: The Warner & Swasey Company, Cleveland, Ohio

[*] Notice: The portion of the term of this patent subsequent to Jun. 17, 2003 has been disclaimed.

[21] Appl. No.: 694,377

[22] Filed: Jan. 24, 1985

[51] Int. Cl.$^4$ ............................................... G01B 7/28
[52] U.S. Cl. ....................................... 33/1 M; 33/551
[58] Field of Search ................ 33/1 M, 174 C, 169 R, 33/172 E, 174 R, 551, 558, 561

[56] References Cited

U.S. PATENT DOCUMENTS

| | | | |
|---|---|---|---|
| 2,620,256 | 12/1952 | Kerns et al. | 346/32 |
| 3,241,243 | 3/1966 | Speer | 33/174 |
| 3,749,501 | 7/1973 | Wieg | 356/169 |
| 3,840,993 | 10/1974 | Shelton | 33/1 M |
| 4,155,173 | 5/1979 | Sprandel | 33/174 |
| 4,175,327 | 11/1979 | Herzog | 33/1 M |
| 4,315,371 | 2/1982 | Kotani et al. | 33/1 M |
| 4,442,607 | 4/1984 | Sakata et al. | 33/1 M |

FOREIGN PATENT DOCUMENTS

| | | | |
|---|---|---|---|
| 2546544 | 5/1976 | Fed. Rep. of Germany | 33/1 M |
| 55-69008 | 5/1980 | Japan | |
| 518161 | 7/1972 | U.S.S.R. | |

Primary Examiner—Willis Little
Attorney, Agent, or Firm—Raymond J. Eifler

[57] ABSTRACT

A bridge type coordinate measuring machine (CMM) characterized by a bridge (20) that has a closed loop configuration encircling the upper surface (11) of the measuring machine base (10). The bridge (20) includes two uprights (21, 22), an upper member (23) connecting the uprights together, and a lower member (24) that connects the uprights together above the ways (12, 13) and below the upper surface (11) of said base (10). Bearings (41) acting in three perpendicular directions on each guideway (12, 13) minimize unwanted movement of the bridge (20). This arrangement increases the resonant frequency of the bridge, improves the CMM accuracy and repeatability, and provides for easy assembly of the bridge (20) onto the base (10). Bearings (41) for the bridge are offset inwardly from the vertical axis of the uprights of the bridge and a respective guideway (12, 13), along which the bearings travel, is located on each side of the base. The bearings (41) operate upwardly, downwardly and sidewardly against the surfaces of the guideways (12, 13).

13 Claims, 3 Drawing Figures

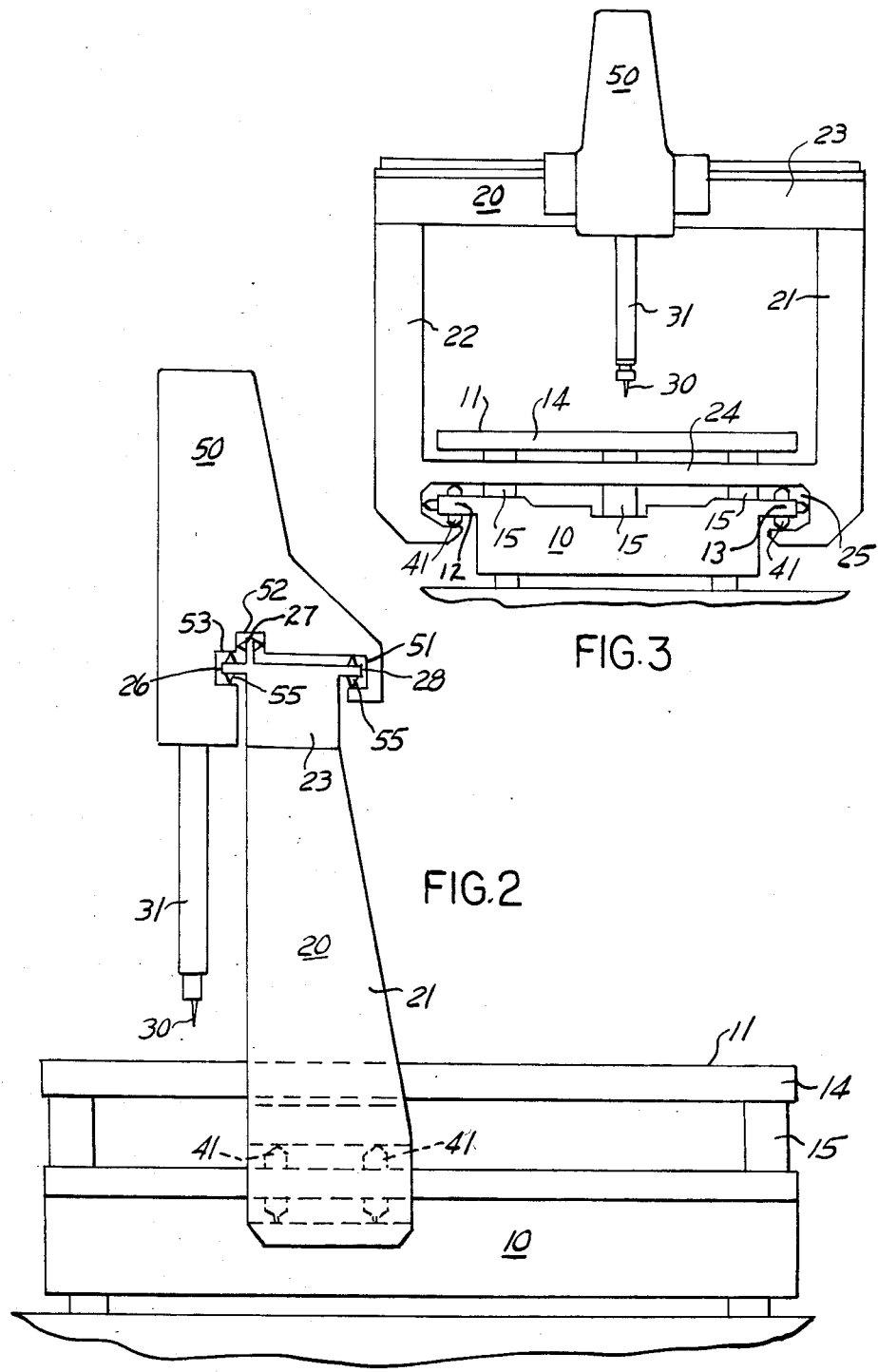

BRIDGE TYPE COORDINATE MEASURING MACHINE

This invention relates to a bridge type coordinate measuring machine (CCM) for measuring the dimensions of a workpiece.

A bridge type coordinate measuring machine is generally comprised of a base, a bridge moveably mounted to the base, a carriage moveably mounted to the upper portion of the bridge, a probe moveably mounted to the carriage and a measuring and computation system that responds to movement of the probe for measuring the dimensions of a workpiece located on the upper surface of the base. Examples of bridge type coordinate measuring machines may be found in U.S. Pat. Nos.: 3,749,501 entitled "Measuring Machine" issued July 31, 1973; and 3,840,993 entitled "Coordinate Measuring Machine" issued Oct. 15, 1974. The important functions of a coordinate measuring machine are its accurate measurement and its repeatability i.e. ability to repeat or obtain the same measurement from the same workpiece. In a bridge type coordinate measuring machine accuracy and repeatability may be adversely affected by vibration and relative movement between the uprights of the bridge. Poor stiffness or rigidity of the bridge permits relative movement between the uprights of the bridge while height, spacing and stiffness all affect resonant frequency, which if low, makes the measuring probe mounted on the bridge more susceptible to vibrations.

One approach to minimizing or dampening the effect of vibrations on a CMM has been to mount the CMM on an air bag apparatus or large concrete platform or increase the mass of the bridge uprights. These approaches are expensive, space consuming and the first two only isolate external vibrations i.e., ground vibrations and internal vibrations e.g., caused by electro mechanical servo mechanisms mounted on the machine, would not be isolated or dampened.

One approach to minimizing the effect of relative movement between the bridge uprights is discussed in the U.S. Pat. No. 3,749,501 patent where a position indicator is located on each upright. However, this increases the cost for the positional and measurement apparatus of the CMM and still does not address the problem of an undesirable low resonant frequency that can be present in a bridge structure e.g. a resonant frequency below 20 Hertz can adversely effect the measuring accuracy of a CMM.

Accordingly, the accuracy of the measurements made by a bridge type coordinate measuring machine with a bridge having large uprights e.g. a height greater than 1 meter, may be adversely affected by a low resonant frequency of the bridge.

DISCLOSURE OF THE INVENTION

The invention is a bridge type coordinate measuring machine that has a closed loop bridge configuration that encircles the upper surface of a measuring machine base upon which a workpiece is placed for measurement and is characterized by the location of the bearings for the bridge being offset from the vertical axis of the uprights of the bridge and by a guideway for the bearings located on each side of the base. The lower member of the bridge, that is connected to the uprights, is located above the ways on the base, along which the bridge moves. Bearings acting in three perpendicular direction on each way minimize unwanted movement of the bridge. With the lower horizontal connecting member of the bridge above the ways, rather than below the ways, the distance between the upper and lower horizontal bridge members is shortened without changing the work space available between the upper bridge member and the upper surface of the base. This also results in better stability and stiffness of the bridge, causing the bridge to have a higher resonant frequency i.e., less subject to vibrations.

One advantage of this invention is that it improves the measuring accuracy of a CMM used for measuring large workpieces such as automobile engine blocks and automobile body parts.

Another advantage of this invention is that it reduces relative movement between the uprights of the bridge of a CMM, especially when the uprights have a height greater than 1 meter.

Another advantage of this invention is that it lowers the effect of vibrations on the bridge and probe mounted on the bridge by increasing the resonant frequency of the bridge.

Another advantage of this invention is that it minimizes the need for an expensive system to isolate the bridge and measuring probe of a CMM from external vibrations.

Another advantage of this invention is that it eliminates the sag effect that a heavy work piece, placed in the upper surface of the base, has upon the ways.

BRIEF DESCRIPTION OF THE INVENTION

FIGS. 1, 2 and 3 are perspective views of a bridge type coordinate measuring machine incorporating the principles of this invention.

DETAILED DESCRIPTION OF THE INVENTION

Figure 1:
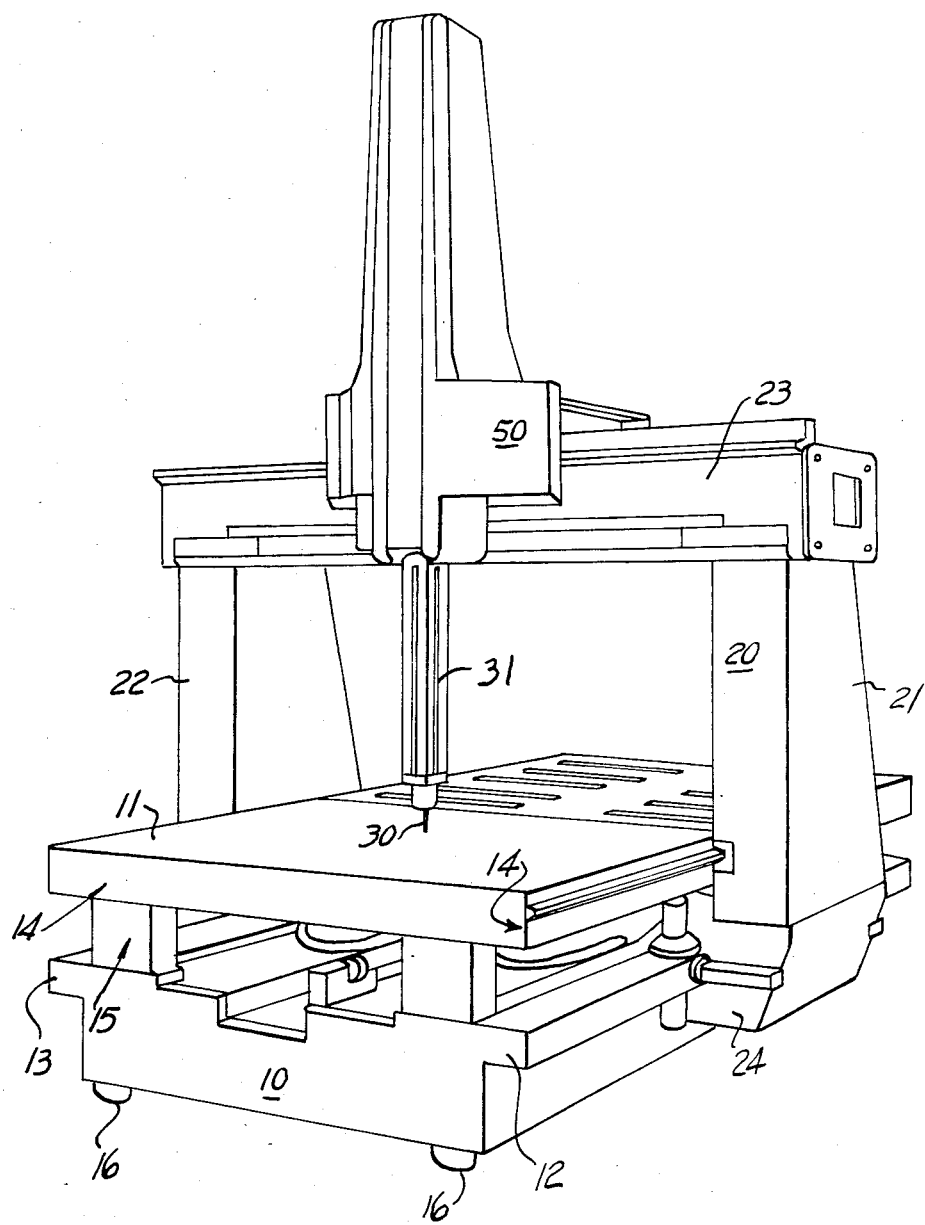

Referring now to the drawings, FIG. 1 illustrates a bridge type coordinate measuring machine of the type having a base 10, a bridge 20 moveably mounted to the base 10, a carriage 50 moveably mounted to the bridge 20, and a probe 30 moveably mounted to the carriage 50. The base 10 includes an upper surface 11 upon which a workpiece (not shown) to be measured is located and guideways 12, 13. The base 10 is divided into an upper table portion 14 separated from the lower portion by legs 15. Rubber feet 16 at the bottom of the base 10, isolates the CMM from external vibrations. This arrangement of the guide ways 12, 13, and legs 15 provides space, if desired, for a motor and suitable drive mechanism for moving the bridge 20 to be located at the center of the base 10. The bridge 20 includes two uprights 21, 22 connected together by an upper member 23 and a lower member 24. Moveably mounted on the upper member 23 of the bridge 20 is a carriage 50 which has moveably mounted thereto a probe shaft 31 having a probe 30 at one end thereof. The probe 30 is generally of the type that, upon contact with a piece to be measured, provides a signal to an appropriate computation and measuring apparatus. One example of such a probe may be found in U.S. Pat. No. 4,270,275 entitled "Probes" and issued June 16, 1981. The bridge 20 is moveably mounted to the base 10 along guide ways 12, 13, the surfaces of which interface with bearings 41 mounted in respective channels 25 in the bridge 20. Preferably, air bearings 41 are used to facilitate movement of the bridge 20 along the guideways 12, 13 of the base 10. Movement of the bridge, carriage and probe shaft allows the probe to move and take measurements in three directions. Electrical or mechanical means responsive to movement of the probe indicate the position of the probe in 3 coordinates and, when required, calculate measurements e.g., The Warner and Swasey Company, Sheffield Measurement Division measurement processor model MP3.

FIG. 2 illustrates how the carriage 50 is moveably mounted to the upper member 23 of the bridge 20 along guideways 26, 27, 28 the surfaces of which interface with bearings 55 in respective channels 51, 52, 53 in the carriage 50. The probe 30 is mounted to the bridge 20 for movement along 2 axis and is moveable along a third axis by movement of the bridge. Mounting arrangements for the probe and carriage are described in further detail in the U.S. Pat. Nos. 3,749,501 and 3,840,993 patents. Mechanical or preferably air bearings 55 are used to facilitate movement of the carriage 50 relative to the bridge 20. Also shown is the arrangement of the upper and lower bearings 41 of the bridge 20 that coact with the surfaces of one of the guide ways 12 of the base 10.

FIG. 3 illustrates further details of how the air bearings 41, located in channels 25 in the bridge 20, interface with the surfaces of the guide ways 12, 13 of the base 10. Preferably, the lower member 24 of the bridge 20 is located above the bearings 41 and below the table portion 14 of the base 10. The upper table portion 14 of the base 10 is supported by only three legs 15. This provides better stability than would four legs i.e., one in each corner of the table 14.

I claim:

1. A bridge type coordinate measuring machine of the type having a base (10) having a horizontal table surface (11) for supporting a work piece to be measured, a bridge (20) having a closed loop configuration that extends around said table surface (11), by passing above and below the table surface (11) of said base (10), said closed loop configuration formed by two uprights (21, 22) extending vertically above and below the level of said table surface, a first horizontally extending member (23) joined at one end to one of the uprights (21, 22) and joined at the other end to the other of said uprights so as to extend across and above the table surface (11) of said base (10), and a second horizontally extending member (24) joined at one end to one of said uprights, and joined at the other end to the other of said uprights, so as to move with said bridge along said first horizontal axis, means (25, 12, 13, 41) for mounting the bridge (20) to the base for movement along a first horizontal axis including horizontally extending guideways (12, 13) supporting said bridge and along which the uprights (21, 22) of the bridge (20) move; the second horizontal extending member (24) located at a vertical level below the table surface (11) of said base (10) and above the vertical level of the ways (12, 13) a probe (30); means (50, 31) for mounting said probe (30) on said first horizontal member (23) of said bridge (20) for movement along a second horizontal axis and a vertical axis, said first and second horizontal axes and said vertical axis orthogonally arranged, said mounting of said bridge and said probe thereby enabling movement of said probe about orthogonal axes to measure distances on a workpiece positioned on said table surface (11) of said base (10), the means for moveably mounting the bridge (20) to the base (10) characterized by:

a pair of said guideways (12, 13), each one thereof coacting with a respective plurality of bearings (41), said guideways and bearings located below the upper table surface (11), one (12) of said guideways and its respective bearings (41) located at one side of said base (10) and the other (13) of said guideways and its respective bearings located at the opposite side of said base (10), one of said guideways (12) having a sidewardly facing surface that faces in the opposite direction of a sidewardly facing surface of the other guideway (13), so that the bearings (41) apply forces in opposite directions against the uprights (21, 22) of the bridge (20).

2. A coordinate measuring machine as described in claim 1 wherein the height (H) of the uprights is greater than 1 meter.

3. A coordinate measuring machine as described in claim 1 wherein the means for moveably mounting the bridge (20) to the base (10) is characterized by:

one (12) of said ways (12, 13) mounted on one side of said base (10) and another (13) of said ways (12, 13) mounted on the opposite side of said base (10), said ways coacting with bearings (41) in a respective channel (25) in said bridge (20) for supporting said bridge (20) for movement on said base.

4. A bridge type coordinate measuring machine as described in claim 1 wherein said base (10) includes a table portion (14) formed with an upper table surface (11), said table portion (14) spaced from and mounted to a lower base portion that includes said ways (12, 13), said second member (24) of said bridge (20) extending through a space between said table portion (14) and lower portion of said base.

5. A bridge type coordinate measuring machine as described in claim 2 wherein said base (10) includes a table portion (14) formed with an upper table surface (11), said table portion (14) spaced from and mounted to a lower base portion that includes said ways (12, 13), said second member (24) of said bridge (20) extending through a space between said table portion (14) and lower portion of said base.

6. A bridge type coordinate measuring machine as described in claim 3 wherein said base (10) includes a table portion (14) formed with an upper table surface, (11), said table portion (14) spaced from and mounted to a lower base portion that includes said ways (12, 13), said second member of said bridge (20) extending through a space between said table portion (14) and lower portion of said base.

7. A bridge type coordinate measuring machine of the type having a base (10) having an upper surface (11) for supporting a work piece to be measured, a bridge (20) having a closed loop configuration that encircles the upper surface (11) of said base (10) two uprights (21, 22), said closed loop configuration formed and a first member (23) connecting the uprights (21, 22) together above the upper surface (11) of said base (10), a second member (24) connecting together the uprights (21, 22) of the bridge (20) below the upper surface (11) of said base (10), means (12, 13, 41), located below the second member (24), for moveably mounting the bridge (20) to the base (10), a probe (30), and means (50, 31) for mounting said probe (30) to the first member (23) of said bridge (20) for movement relative to said bridge and to said base (10), the means for moveably mounting the bridge (20) to the base (10) characterized by:

a pair of guideways (12, 13), one of said guideways (12) located to one side of said base (10) and the other of said guideways (13) located to the opposite side of said base (10), each of said guideways (12, 13) coacting with a respective upper, lower, and said bearings (41) that provides bearing surfaces in three directions against each guide way.

8. A bridge type coordinate measuring machine of the type having a base (10) having an upper surface (11) for supporting a work piece to be measured, a bridge (20) having a closed loop configuration that encircles the upper surface (11) of said base (10) said closed loop configuration formed by two uprights (21, 22), a first member (23) connecting the uprights (21, 22) together above the upper surface (11) of said base (10), and a second member (24) connecting together the uprights (21, 22) of the bridge (20) below the upper surface (11) of said base (10), means (12, 13, 41), located below the second member (24), for moveably mounting the bridge (20) to the base (10), a probe (30), and means (50, 31) for mounting said probe (30) to the first member (23) of said bridge (20) for movement relative to said bridge and to said base (10), the means for moveably mounting the bridge (20) to the base (10) characterized by:

a pair of guideways (12, 13), located below the upper surface (11) of the base (10), one of said guideways (12) located on one side of said base (10) and the other of said guideways (13) located on the opposite side of said base (10), each of said guideways (12, 13) coacting with respective bearings (41) located in a respective channel (25) formed between said second member (24), and an inwardly extending portion of each of said uprights (21, 22), said bearings (41) include bearings that correct against upwardly, downwardly, and sidewardly facing surfaces of a respective guideway (12, 13).

9. A coordinate measuring machine as described in claim 8 wherein said bearings (41) include bearings that coact against upwardly, downwardly and sidewardly facing surfaces of a respective guideway (12, 13).

10. A bridge type coordinate measuring machine as described in claim 8 wherein the bearings (41) are located between the vertical axis of the uprights (21, 22).

11. A bridge type coordinate measuring machine as described in claim 8 wherein the bearings (41) coacting upwardly and downwardly are located beneath the upper surface (11) of the base (10).

12. A bridge type coordinate measuring machine as described in claim 10 wherein the bearings (41) coacting upwardly and downwardly are located beneath the upper surface (11) of the base (10).

13. A bridge type coordinate measuring machine of the type having a base (10) having an upper surface (11) for supporting a work piece to be measured, a bridge (20) having a closed loop configuration that encircles the upper surface (11) of said base (10) said closed loop configuration formed by two uprights (21, 22), a first member (23) connecting the uprights (21, 22) together above the upper surface (11) of said base (10), and a second member (24) connecting together the uprights (21, 22) of the bridge (20) below the upper surface (11) of said base (10), means (12, 13, 41), located below the second member (24), for moveably mounting the bridge (20) to the base (10), a probe (30), and means (50, 31) for mounting said probe (30) to the first member (23) of said bridge (20) for movement relative to said bridge and to said base (10), the means for moveably mounting the bridge (20) to the base (10) characterized by:

a pair of guideways (12, 13), each of said guideways (12, 13) coacting with a respective plurality of bearings (41), said guideways and bearings located below the upper surface (11) of the base (10), one of said guideways (12) and its respective bearings (41) located at one side of said base (10) and the other of said guideways (13) and its respective bearings (41) located at the opposite side of said base (10), one of said guideways (12) having a sidewardly facing surface that faces in the opposite direction of a sidewardly facing surface of the other guideway (13), so that the bearings (41) apply forces in opposite directions against the uprights (21, 22) of the bridge (20).

* * * * *

UNITED STATES PATENT OFFICE
CERTIFICATE OF CORRECTION

Patent No. 4,630,374           Dated  December 23, 1986

Inventor(s)  Freddie L. Raleigh

It is certified that error appears in the above-identified patent and that said Letters Patent are hereby corrected as shown below:

Add the following to Item 56 on the cover sheet of the subject patent identifying FOREIGN PATENT DOCUMENTS:

621955 8/1978 U.S.S.R...33/1M

Signed and Sealed this

Eighth Day of September, 1987

*Attest:*

DONALD J. QUIGG

*Attesting Officer*        *Commissioner of Patents and Trademarks*